United States Patent [19]

Roberson

[11] 4,088,468

[45] May 9, 1978

[54] METHOD AND APPARATUS FOR APPLYING SIZE TO GLASS STRANDS

[75] Inventor: Cletis L. Roberson, Newark, Ohio

[73] Assignee: Owens-Corning Fiberglas Corporation, Toledo, Ohio

[21] Appl. No.: 751,785

[22] Filed: Dec. 16, 1976

[51] Int. Cl.² ............................................. C03B 37/02
[52] U.S. Cl. ...................................... 65/3 R; 34/16; 34/92; 34/95; 65/2; 65/11 W; 118/50; 118/63; 118/72; 427/294; 427/314
[58] Field of Search ............... 118/50, 63, 72; 65/3 R, 65/3 A, 3 C, 2, 11 W; 427/350, 294, 314; 34/9, 16, 92, 95

[56] References Cited

U.S. PATENT DOCUMENTS

| | | | |
|---|---|---|---|
| 2,203,241 | 6/1940 | Waldrow | 118/50 |
| 3,318,757 | 5/1967 | Atwell | 65/3 C X |
| 3,681,039 | 8/1972 | Marzocchi | 65/3 R |
| 3,717,448 | 2/1973 | Smith | 118/63 X |
| 3,986,274 | 10/1976 | Holm | 34/16 X |
| 3,999,970 | 12/1976 | Borch et al. | 65/3 R X |

*Primary Examiner*—Robert L. Lindsay, Jr.
*Attorney, Agent, or Firm*—Ronald C. Hudgens; Philip R. Cloutier; Kenneth H. Wetmore

[57] ABSTRACT

This invention relates to a method and apparatus for forming glass filament in which a fluid is applied to the filament which is passed in contact with a suction means to contact the filament with air to remove the fluid from the filament and subsequently applying a sizing composition to the filament.

6 Claims, 6 Drawing Figures

METHOD AND APPARATUS FOR APPLYING SIZE TO GLASS STRANDS

This invention relates to applying coatings to fibers.

In one of its more specific aspects, this invention relates to a method and apparatus for applying sizes to glass fibers.

The application of coatings to glass fibers is well known. Usually such coatings, or sizes, are applied to the fibers shortly after the fibers are attenuated from a mass of molten glass. Such attenuation is usually carried out by drawing individual filaments through orificed bushings. The filaments are cooled by quenching media in individual or gathered form and, thereafter, are sized to facilitate subsequent handling.

Sizes are of various type and include both aqueous and non-aqueous based compositions which contain various components in specific quantities. These sizes can also have defined viscosities which enable proper application to the glass strands. However, whether of aqueous or the non-aqueous type, it frequently occurs that the fibers, after passing through a quenching process preliminary to the sizing step, contain on their surface a quantity of extraneous fluid, such as water, in an amount sufficient to interfere with the efficient application of the size. As a result, the continuity of the coating is disrupted by dilution of the size composition on the filament or the size batch from which the size is taken and applied to the strand is diluted by water removed from the filaments upon contact with the applicator which applies the size to the filament. The employment of this invention results in a package in which the filaments contain a low percentage of moisture. As a result, there is reduced size migration as the package dries.

According to this invention, there is provided a method of processing a glass filament having a fluid on the surface thereof which comprises withdrawing at least a portion of the fluid from the surface of the filament and then applying a size to the surface of the filament.

Also, according to this invention there is provided apparatus for processing glass filaments which comprises apertured suction means for the removal of aqueous matter from glass strands brought into contact therewith in combination with size applicator means adapted to apply a size to the filaments thereafter.

The invention is applicable to glass filaments of any size and type, either in the form of individual filaments or gathered in strands of a multiplicity of fibers.

The invention is applicable to remove any fluid material from the filament or strands. It is applicable to remove water, aqueous based compositions, oils, solvents and the like, applied in any manner to the strands prior to the size application.

The invention is applicable with any size regardless of the nature thereof, including aqueous-based sizes, organic-based, non-aqueous sizes and the like.

The invention will be explained with reference to the attached drawing in which.

Figure 1:
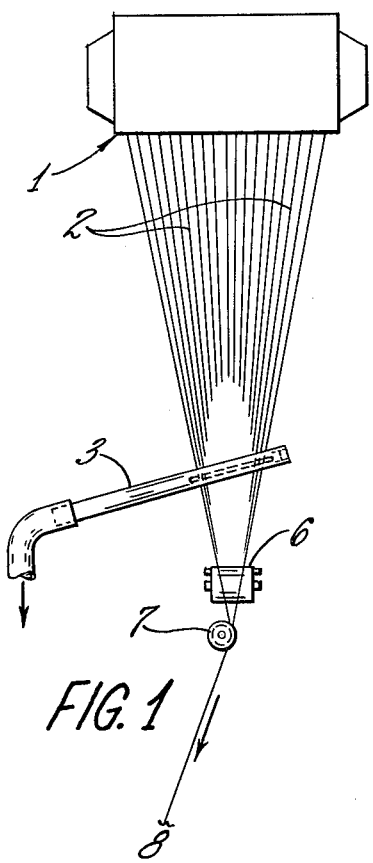
FIG. 1 is an elevational view of the apparatus of this invention.
Figure 2:
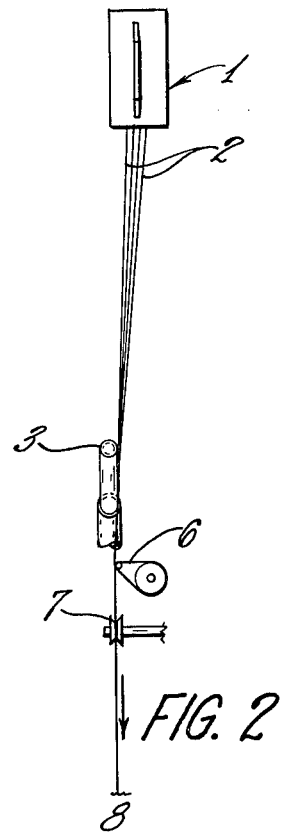
FIG. 2 is a side elevational view of the apparatus illustrated in FIG. 1.

Referring now to FIGS. 1 and 2, there are shown filaments 2 drawn from any molten glass container 1 and passing across suction rod, or tube, 3.

Rod 3 has apertures, or preferably an elongated slot, 20 positioned along one side thereof. One end 23 of rod 3 is connected to suction means, not shown; the other end of the rod is closed.

The fibers, after passing into contact with rod 3, are then passed into contact with size applicator 6 where a size is applied. From the size applicator, the sized filaments can pass into contact with a gathering shoe 7 and thence to a collector 8, for example, a winder, not shown.

Figure 3:
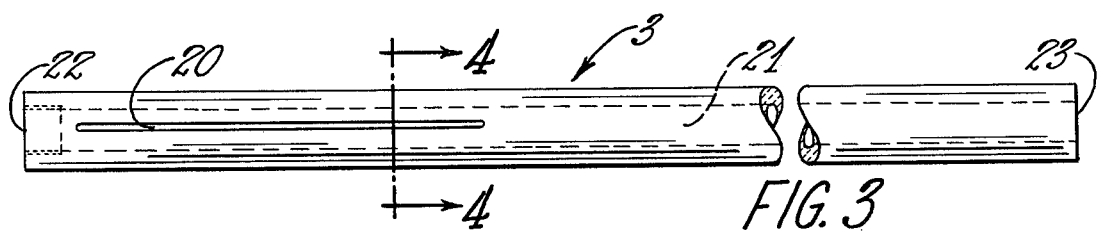
FIG. 3 is a view of one embodiment of the apparatus of this invention.
Figure 4:
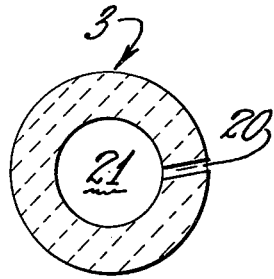
FIG. 4 is a cross-sectional view of FIG. 3. through section 4 — 4.

As shown in FIG. 3, rod 3 is closed at one end 22 and is adapted along a portion of its length by slot 20 which provides open communication with the interior 21 of the rod. End 23 of the rod is adapted for connection to suction means.

In the operation of the invention, the fibers are passed over slot 20. Suction is drawn on the rod in such a manner that air is drawn across the filaments into the interior of the rod. As the air passes over the filaments, the air tends to carry with it the liquid from external surface of the filaments. In this manner, the liquid on the surface of the filaments is considerably reduced, this reduction in liquid content facilitating the application of the size by the size applicator.

Figure 5:
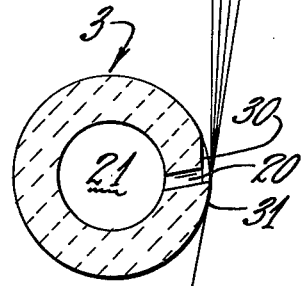
FIGS. 5 and 6 are cross-sectional views of the rod shown in FIG. 3.
Figure 6:
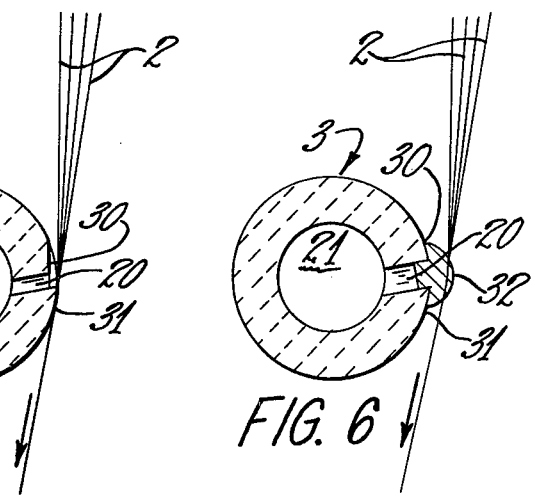

Other embodiments of the suction rod are shown in FIGS. 5 and 6.

In FIG. 5, the opposing walls of slot 20 are of unlike heights, that is, one of the walls of the slot projects outwardly a distance greater than the outward projection of the other of the walls of the slot, thus forming a lip. The walls of the slot need not be parallel to the centerline of the slot, the up-stream lip 30 being recessed as compared to the down-stream lip 31. This lip facilitates removal of the liquid from the strand.

In FIG. 6, a liquid-absorbing material 32 is positioned bridging slot 20. Any liquid-absorbing material is satisfactory. For example, a porous, rubber sponge-like material is satisfactory. The porous material absorbs the liquid from the strand. Air is drawn through the liquid-absorbing material into the rod, this withdrawal acting to enable the liquid-absorbing material to efficiently absorb additional quantities of liquid from the glass. This method is particularly efficient when the liquid absorbing material is a soft, pliable material which tends to envelope the fibers as the fibers are drawn over it.

The suction rod can be made of any suitable material such as brass or graphite. A graphite rod about 0.5 inch in diameter, about 9 inches long, having a 3 inch long slot opening into a 0.25 inch passageway through the rod has been found satisfactory. The slot can be of any suitable dimension, for example, about 0.05 inch in width and 2.75 inches in length. The sides of the slot opening into the rod, or tube, can be parallel or can diverge outwardly from a common centerline at about 10.

It will be evident from the foregoing that various modifications can be made to this invention. Such, however, are considered to be within the scope of the invention.

What is claimed is:

1. Apparatus for applying a coating to a filament having a liquid on the surface thereof comprising:

(a) a walled member, the wall of said member having an aperture communicating through the wall of said member;
(b) a liquid-absorbing material, adapted for contact with said filament, and positioned in contact with said aperture; and,
(c) means providing a suction to the interior of said walled member to aid in removal of said liquid from from said filament,
(d) means for applying a coating to said filament upon disengagement from said contact with said liquid-absorbing material.

2. The apparatus of claim 1 in which said aperture comprises an elongated slot.

3. The apparatus of claim 1 in which walls of said slot diverge from the centerline of said slot.

4. The apparatus of claim 3 in which one of the walls of said slot projects outwardly a distance greater than the outward projection of the other of the walls of said slot.

5. A method of applying a size composition to a glass filament having a quenching fluid on the surface thereof which comprises:
(a) passing said glass filament into contact with suction means;
(b) drawing air into contact with said glass filament;
(c) withdrawing said quenching fluid from the surface of said glass filament into said suction means; and
(d) applying a size composition to said glass filament.

6. The method of claim 5 in which said filament is passed into contact with liquid-absorption means superimposed on said suction means.

* * * * *